United States Patent [19]

Mawla

[11] Patent Number: 4,882,508
[45] Date of Patent: Nov. 21, 1989

[54] DUAL FLUX PATH VOICE COIL MOTOR

[75] Inventor: Khalid A. Mawla, Monte Sereno, Calif.

[73] Assignee: International Business Machines, Armonk, N.Y.

[21] Appl. No.: 168,057

[22] Filed: Mar. 14, 1988

[51] Int. Cl.[4] .............................................. H02K 41/00
[52] U.S. Cl. .................................... 310/13; 360/78.13; 310/12
[58] Field of Search .............................. 310/12, 13, 14; 360/78.12, 78.13, 106; 369/43

[56] References Cited

U.S. PATENT DOCUMENTS

| | | | |
|---|---|---|---|
| 3,505,544 | 4/1970 | Helms | 310/13 |
| 3,723,780 | 3/1973 | Gillum | 310/13 |
| 3,889,139 | 6/1975 | Hughes | 310/13 |
| 4,439,699 | 3/1984 | Brende et al. | 310/13 |
| 4,456,934 | 6/1984 | Wedman et al. | 360/78 |
| 4,462,054 | 7/1984 | Dong et al. | 360/106 |
| 4,546,277 | 10/1985 | Carbonneau et al. | 310/13 |
| 4,652,779 | 3/1987 | Wilcox | 310/13 |
| 4,661,729 | 4/1987 | Hames et al. | 310/13 |
| 4,728,830 | 3/1988 | Gamble | 310/12 |

FOREIGN PATENT DOCUMENTS

| | | |
|---|---|---|
| 3032308 | 8/1979 | Fed. Rep. of Germany . |
| 59-113603 | 6/1984 | Japan . |
| 61-85054 | 4/1986 | Japan . |
| 62-95956 | 5/1987 | Japan . |
| 62-95957 | 5/1987 | Japan . |

Primary Examiner—Patrick R. Salce
Assistant Examiner—Judson H. Jones
Attorney, Agent, or Firm—Thomas R. Berthold

[57] ABSTRACT

A dual flux path linear voice coil motor (VCM) for use as a disk file linear actuator has a magnetically permeable center core which is separated by non-magnetic insert into two sections spaced apart along a longitudinal axis parallel to the VCM's linear access direction. The center core has recessed parallel flat faces equally spaced on opposite sides of the longitudinal axis which form pockets in the center core. Permanent magnets are embedded in the pockets of the center core and span the space between the center core sections. The VCM generates is essentially constant force on the coil for a constant current, regardless of coil stroke position or direction of movement.

5 Claims, 3 Drawing Sheets

DUAL FLUX PATH VOICE COIL MOTOR

TECHNICAL FIELD

This invention relates to an electromagnetic actuator for positioning read/write heads to appropriate data tracks in a data recording disk file. More particularly, the invention relates to an improved linear voice coil motor (VCM) actuator having a dual magnetic flux path which provides generally constant response characteristics in both directions of movement over the entire stroke of the coil.

BACKGROUND OF THE INVENTION

A typical disk file linear VCM actuator comprises a coil movable through the magnetic field of a permanent magnetic stator. The VCM includes a fixed magnetically permeable center core and a magnetically permeable outer core surrounding and spaced from the center core. Permanent magnets are attached to the outer core and spaced from the center core to define a working gap through which magnetic flux passes. A movable coil is supported within the working gap and is connected to a carriage which supports the read/write heads. The application of current of proper magnitude and polarity to the coil produces a magnetic field which reacts with the magnetic field in the working gap to apply force to the coil and carriage to move the attached read/write heads radially relative to the disks.

In disk files which have a relatively high density of data tracks on the disks, a servo control system is typically used to position the heads to the desired data tracks in the minimum time and to maintain the heads precisely over the center lines of the desired tracks during read or write operations. In order to determine the value of the control current to be applied to the coil of the VCM, it is necessary to know the relationship between the current applied to the VCM and the acceleration of the coil and carriage. This relationship is given by the acceleration factor ($K_f/M$) which defines the acceleration of the coil and carriage per unit of input current. The term $K_f$ is the force factor which relates force applied to the coil of the input current, and M is the mass of the movable portion of the VCM (i.e. the coil, carriage, and attached head/arm assemblies). The value of the force factor $K_f$ typically varies with the linear stroke position of the coil in the gap of the VCM. In addition, the profile of $K_f$ with position is different for different directions of movement. Conventional servo control systems cannot compensate for any variation in $K_f$ with position, but rather assume a constant $K_f$ regardless of the actual $K_f$. For this reason, it is desirable to design the VCM in order to make $K_f$ constant with position, as well as to make the $K_f$ profile the same regardless of the direction of movement.

Certain disk file linear VCMs have a dual magnetic flux path through which the coil moves. In such disk files the variation $K_f$ with position and direction is accentuated because at certain times the coil is subjected to the magnetic flux from both magnetic flux paths.

SUMMARY OF THE INVENTION

The invention is a dual flux path linear VCM which generates an essentially constant force per unit of input current regardless of the linear position of the coil within the gap or the direction of movement of the coil.

The VCM has a magnetic stator which comprises a rectangularly shaped center core divided into like sections and separated by a non-magnetic insert, a surrounding outer core, and permanent magnetics attached to both the center core and the outer core and spaced apart so as to define the working gap for the coil.

The magnetically permeable center core has rectangularly shaped pockets for receipt of flat permanent magnets which span the non-magnetic insert. Flat permanent magnets are attached to the corresponding inner walls of the outer core. A shorted copper turn surrounds the center core and is located between the center core and the coil. The arrangement of the magnets on the center core and the outer core, together with the non-magnetic insert which separate the center core into two sections, provides a VCM with a flat $K_f$ profile which is essentially constant in both directions of coil movement.

For a fuller understanding of the nature and advantages of the present invention reference should be made to the following detailed description taken in conjunction with the accompanying drawings.

DESCRIPTION OF THE PREFERRED EMBODIMENTS

Figure 1:
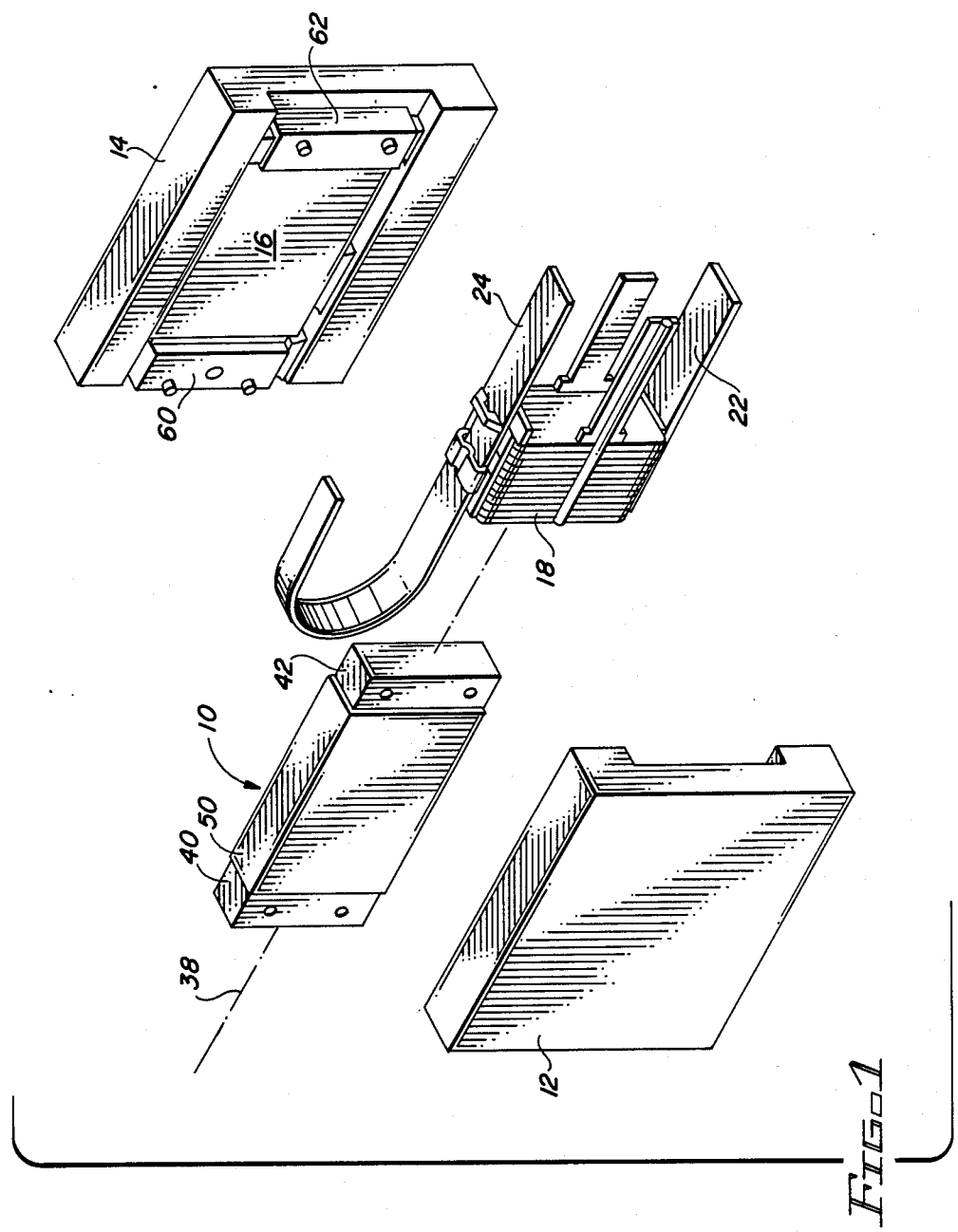
FIG. 1 is an exploded view illustrating the component parts of the VCM.

As shown in FIG. 1, the major components of the VCM are a center core 10 with embedded permanent magnets (not shown in FIG. 1); an outer core having two sections 12, 14 which generally surround the center core 10; permanent magnets, such as permanent magnet 16, on each of the outer core sections; and a movable coil 18.

The outer core sections 12, 14 have generally flat inner walls to which the permanent magnets are attached, such as permanent magnet 16 attached to the inner wall of section 14. A like permanent magnet 17 (FIG. 3) is attached to the inner wall of outer core section 12. The outer core permanent magnets are generally parallel to and spaced apart from corresponding parallel flat walls of center core 10 so as to define a working gap through which the coil 18 is free to move.

Attached to the coil 18 is a carriage (not shown) which has means for mounting the rigid arms (not shown) which support the read/write heads (not shown). The carriage is attached to the coil 18 by means of struts, such as struts 22, 24. As is well known in the art, high precision wheeled bearings attached to the carriage ride on guide rails, thereby permitting linear movement of coil 18 along longitudinal axis 38.

When current is applied to coil 18 the current interacts with the magnetic flux in the working gap and creates a force in the direction parallel to the central longitudinal axis 38 of center core 10, which is the radial direction of access of the read/write heads relative to the disks. The read/write heads are thus moved radially inwardly or outwardly with respect to the data recording disks, depending on the direction of current in the coil. The coil 18 is supported for free movement within the gap by means of the bearing assemblies and their associated guide rails.

Figure 2:
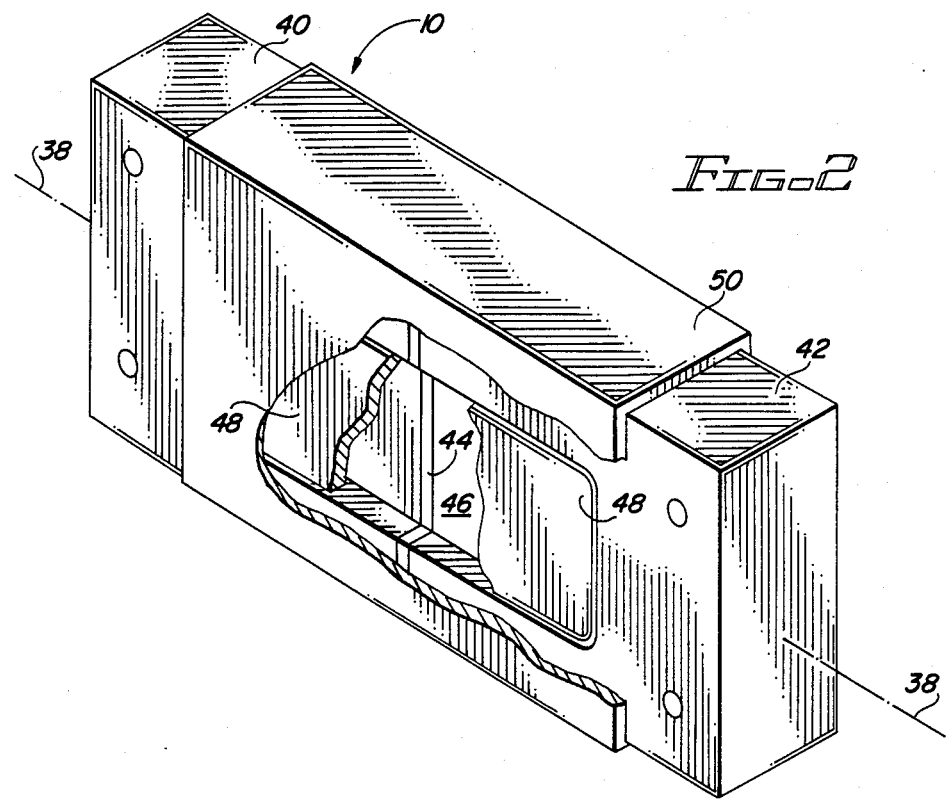
FIG. 2 is a perspective view of the center core illustrating the non-magnetic insert and the embedded magnets.
Figure 3:
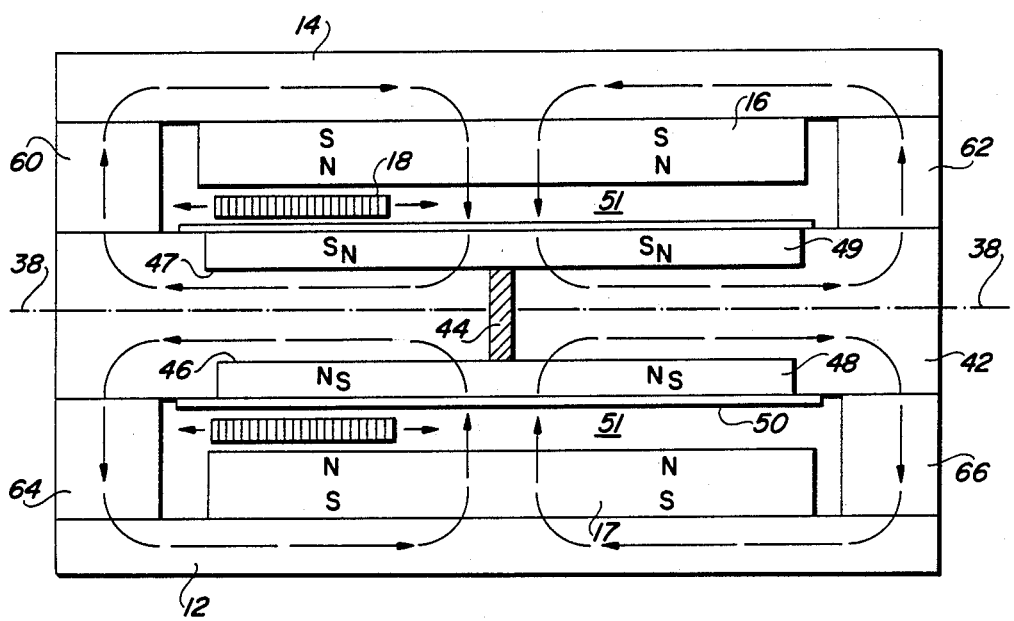
FIG. 3 is a longitudinal sectional view illustrating the dual magnetic flux paths of the VCM.

Referring now to FIG. 2, the construction of the center core with the non-magnetic insert and embedded magnets is illustrated. The center core 10 is formed of two generally like sections 40, 42 of magnetically permeable materials, such as electrical iron (99.7% Fe). The sections 40, 42 are spaced apart along a longitudinal axis 38, which represents the access directions of the VCM, by non-magnetic insert 44. In the preferred embodiment the insert is a nickel-copper alloy, such as Monel (66.5% Ni, 31.5% Cu), and is attached to the sections 40, 42 by brazing so that sections 40, 42 and insert 44 provide a unitary structure for center core 10. The center core 10 has two generally parallel flat faces 46, 47 (FIG. 3) on opposite sides of longitudinal axis 38 which form part of rectangularly-shaped cut-outs defining pockets. Located within each of the pockets is a permanent flat rectanguarly shaped magnet, such as magnet 48 located adjacent to face 46, and a like magnet 49 located adjacent to face 47 (FIG. 3). A rectangularly shaped copper sleeve 50 surrounds the center core 10 and embedded magnets 48, 49. The cooper sleeve 50 acts as a shorted turn and improves the response time of the VCM to the application of current by reducing the reluctance in the magnetic circuit.

The dual magnetic flux paths of the VCM are illustrated in FIG. 3, which is a sectional view along axis 38, the direction of movement of coil 18. The outer core sections 12, 14 include spacers 60, 62 and 64, 66 respectively, which are also formed of magnetically permeable material. The spacers can also be integrally formed as part of core sections 12, 14. Each of the magnets 48, 49 in the center core and their opposing magnets 16, 17 respectively, in the outer core have their magnetic polarities opposed to one another so that a magnetic field passes generally perpendicularly through a working gap 51 defined by the spaced-apart magnets. Thus as shown in FIG. 3 there are two magnetic flux paths, each flux path being located essentially in one-half of the stroke position of the coil 18 through the working gap 51.

Figure 4:
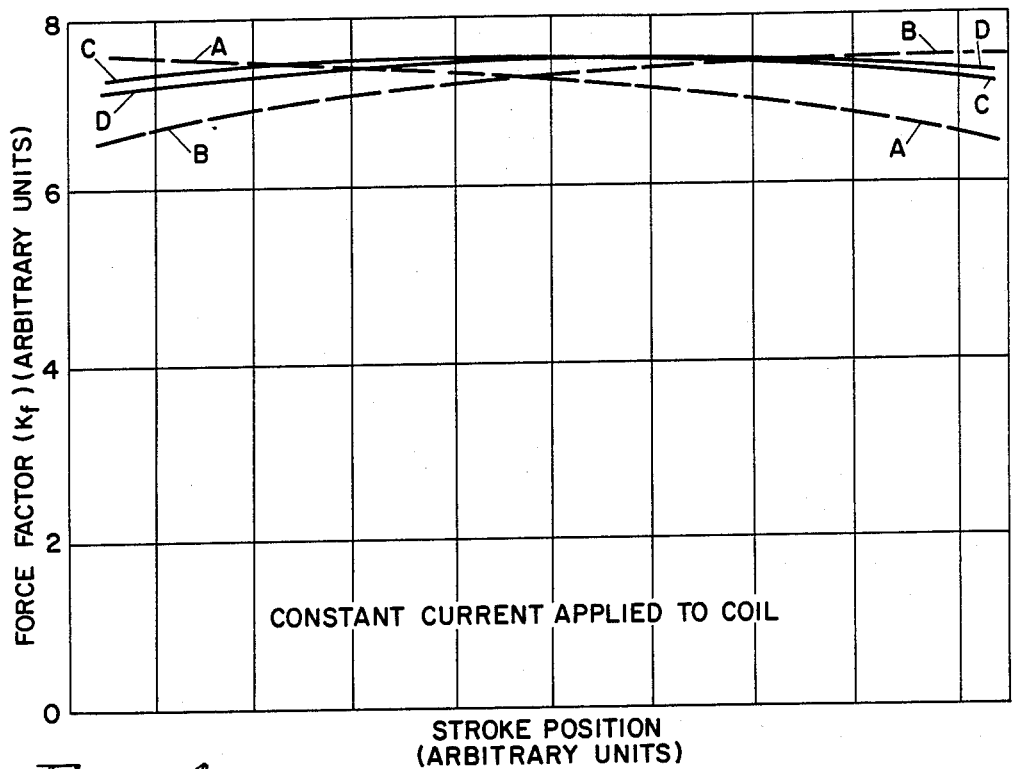
FIG. 4 is a graphical comparison of force factor ($K_f$) as a function of coil position for a VCM without a non-magnetic insert and a VCM of the present invention.

The center core 10 with non-magnetic insert 44 and embedded magnets 48, 49 substantially improves the performance of the dual flux path VCM, as illustrated in FIG. 4. The dashed lines of curves A, B represent the force generated on the coil 18 as a function of stroke position for radially inward and outward directions, respectively, for a constant current in a VCM identical to that of the present invention, but without the non-magnetic insert in the center core. The force curves A and B are nonlinear, especially near the ends of the stroke. In addition, curves A and B are not coincident, so that the VCM will have different response characteristics, depending on the direction of movement of coil 18.

The solid lines of curves C and D in FIG. 4 represent similar force curves but with the VCM according to the present invention having a center core with a non-magnetic insert. The result is that the force on coil 18 substantially more linear with stroke position and is essentially the same in both directions of movement.

The non-magnetic insert 44 must have a finite width to completely separate and space apart the two center core sections 40, 42. Where the center core sections 40, 42 are not completely separated, e.g. if only a partial groove is located in the center core, the benefits shown in FIG. 4 are not obtainable.

Figure 5:
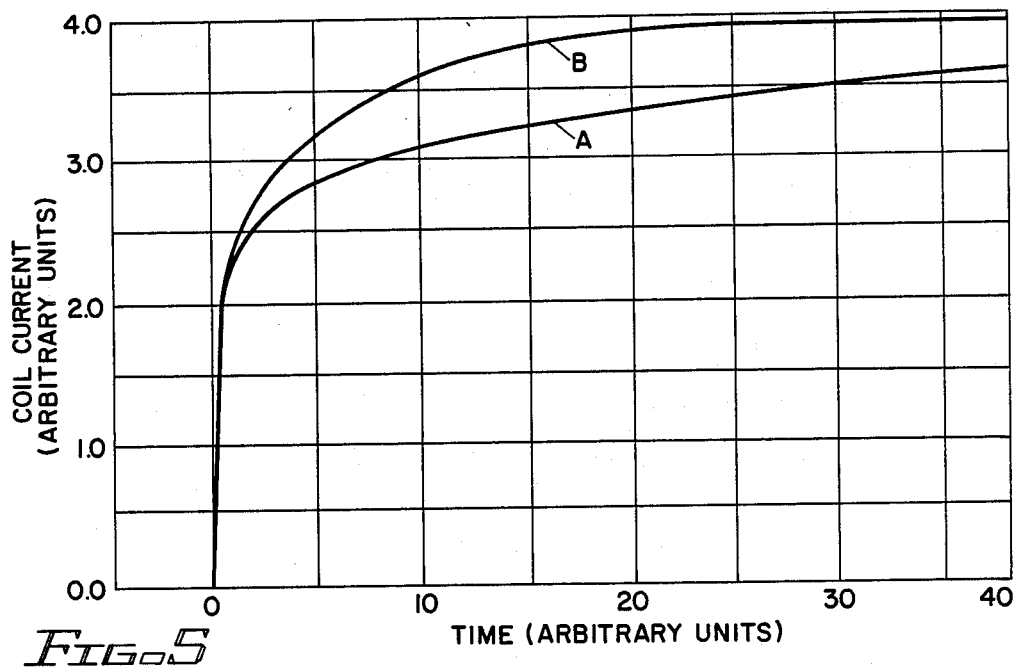
FIG. 5 is a graphical comparison of coil current rise time for a VCM with a conventional core and the VCM of the present invention.

The improved coil current rise time of the VCM made according to the present invention is illustrated in FIG. 5. Curve A represents the coil current rise time for a VCM similar to that shown in FIG. 1, but with a center core having no embedded magnets and no non-magnetic insert. Curve B represents the current rise time for the VCM as described herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A linear voice coil motor actuator having a dual magnetic flux path for head positioning in a disk file comprising:
    a magnetically permeable center core having a central longitudinal axis generally parallel to the linear path of the actuator and two parallel faces on opposites sides of and generally parallel to the central longitudinal axis, the center core further comprising two generally like sections;
    means for supporting the two center core sections in a spaced apart relationship along the center core longitudinal axis;
    a magnetically permeable outer core generally surrounding the center core and having parallel inner walls, each of said outer core inner walls being generally parallel to and spaced from a corresponding center core face;
    at least one generally flat permanent magnet attached to each of said center core faces;
    at least one generally flat permanent magnet attached to each of said outer core inner walls, the magnet on each inner wall having its magnetic polarity opposing the magnetic polarity of the corresponding center core magnet and being spaced therefrom so as to define a gap;
    an electrically conductive coil surrounding the center core and located within the gap; and
    means for supporting the coil within the gap and for providing linear movement of the coil through the gap in a direction generally parallel to the longitudinal axis of the center core.

2. The actuator according to claim 1 wherein the means for supporting the center core sections comprises a magnetically impermeable insert interconnecting said two center core sections.

3. The actuator according to claim 1 wherein said center core faces are recessed within said center core so as to define generally rectanguarly shaped pockets, and wherein said center core magnets are located within said pockets.

4. The actuator according to claim 1 further comprising a shorted copper turn surrounding said center core and located between said center core and said coil.

5. The actuator according to claim 1 further comprising a carriage surrounding at least one head and attached to the coil.

* * * * *